United States Patent Office 2,713,047
Patented July 12, 1955

2,713,047

6-DIETHYLAMINO-1,2-DIHYDROQUINOLINES

David J. Beaver, Richmond Heights, Mo., Paul M. Downey, Gainesville, Fla., and James O. Harris, St. Albans, W. Va., assignors to Monsanto Chemical Company, St. Louis, Mo., a corporation of Delaware No Drawing. Application August 4, 1953,
Serial No. 372,399

6 Claims. (Cl. 260—288)

The present invention relates to new and useful compositions of matter. More particularly it relates to 6-diethylamino substituted 1,2-dihydroquinolines and to methods for their preparation.

The new class of compounds may be represented by the general formula

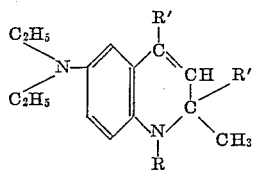

where R represents hydrogen or an alkyl substituent, as for example methyl, ethyl, propyl, isopropyl, and butyl radicals. R' represents a short chain alkyl radical such as methyl, ethyl, propyl or butyl.

The new compounds possess valuable properties which render them suitable for a number of uses, outstanding of which is an adjuvant for rubber compounding. One of the major problems of the rubber industry is protection of natural and synthetic rubber goods against exposure cracking, that is degradation due to ozone while the rubber article is under either static or dynamic stress. The problem is a difficult one and is aggravated by the fact that in general chemical antioxidants or age retarders have little or no value in protecting against deterioration by ozone. The new compounds are efficient anti-exposure cracking agents for sulfur vulcanizable elastomers.

The following examples of the invention illustrate the preparation of the new compounds in detail:

EXAMPLE 1

Into a suitable reactor fitted with a feed line for passing in acetone and a trap for collecting by-product water of condensation, there was charged 49.2 grams of N,N-diethyl-p-phenylenediamine and 3.5 grams of toluenesulfonic acid. The mixture was heated to 135° C. and acetone passed in at the rate of approximately 2.5 moles per hour per mole of amine charged until 13.6 ml. of water were collected. The volatile constituents from the reactor were fed to the center of a fractionating column where the unreacted acetone was stripped out and fed back to the reactor, the by-product water being collected in a reboiler at the bottom of the column maintained at 100° C. The product was then heated under reduced pressure for about 30 minutes to remove any readily volatile constituents remaining. The crude product weighed 78.6 grams. The product was further purified by fractional distillation. The 6-diethylamino-1,2-dihydro-2,2,4-trimethylquinoline had a boiling point of 115–120° C./1 mm., $n_D^{25} = 1.5718$.

EXAMPLE 2

Into a reactor fitted with a reflux condenser there was charged 55.4 grams of 6-diethylamino-1,2-dihydro-2,2,4-trimethylquinoline, 32.1 grams of methyl iodide, 26.6 grams of sodium carbonate and 280 ml. of water. The mixture was heated at refluxing temperature for about 12 hours, the organic layer separated and distilled under reduced pressure. The 6-diethylamino-1,2-dihydro-1,2,2,4-tetramethylquinoline was separated from the crude reaction mixture by distillation at reduced pressure.

As illustrated, the preparation of the new compounds is affected by condensing N,N-diethyl-p-phenylenediamine with a methyl ketone in a molar ratio of at least 1:2 in the presence of a suitable catalyst, such as toluenesulfonic acid, benzenesulfonic acid, sulfuric acid, iodine or bromine. Examples of suitable methyl ketones are acetone, methyl ethyl ketone, methyl isopropyl ketone, and methyl butyl ketone. For introducing an alkyl substituent in the 1-position of a 6-diethylamino-1,2-dihydro-2,2,4-trialkyl-quinoline the iodides are the most satisfactory due to their greater reactivity. However, the bromides are adequate in many instances and in some cases chlorides condense satisfactorily. The reactivity of chlorides is enhanced sharply by using them in conjunction with a small amount of potassium iodide.

Further examples of the invention are: 6-diethylamino-1,2-dihydro-2,4-diethyl-2-methylquinoline, 6-diethylamino-1,2-dihydro-1-methyl-2,4-diethyl - 2 - methylquinoline, 6-diethylamino-1,2-dihydro-1-ethyl-2,2,4-trimethylquinoline, 6-diethylamino - 1,2 - dihydro - 1 - butyl-2,2,4-trimethyl-quinoline.

As illustrative of the anti-exposure cracking properties in vulcanized sulfur vulcanizable synthetic rubber-like materials, stocks were prepared from butadiene-1,3-styrene copolymer compositions utilizing the following ingredients:

| Stock | A | B |
|---|---|---|
| GR-S parts by weight | 100 | 100 |
| Carbon black do | 50 | 50 |
| Saturated hydrocarbon softener do | 10 | 10 |
| Zinc oxide do | 4 | 4 |
| Stearic acid do | 2 | 2 |
| Sulfur do | 1.75 | 1.75 |
| N-Cyclohexyl-2-benzothiazole sulfenamide do | 1.2 | 1.2 |
| 6-Diethylamino-1,2-dihydro-2,2,4-trimethylquinoline parts by weight | | 1.5 |

The stocks so compounded were cured in a press for 30 minutes at 144° C. The vulcanizates were evaluated under dynamic conditions in an atmosphere containing a definite concentration of ozone. Samples of the stocks were cured in the form of a belt ½" wide, ¼" thick and 5 5/16" diameter and mounted on 1" diameter shafts. The ozone concentration was maintained at 20–30 parts per hundred million throughout the test and the shafts were rotated at 75 R. P. M. In this manner a momentary elongation through a range of 0–20% was provided at any portion of the test specimen passing over the shaft. (The apparatus and procedure employed are described in a paper of Creed et al. entitled "An Apparatus for the Evaluation of Ozone Protective Agents for Elastomers under Dynamic Conditions" given at the Cincinnati, Ohio, Meeting of the Rubber Division of the American Chemical Society May 1, 1952). The experimental test specimens were compared visually at various intervals noting the extent of cracking. A stock which is severely cracked has no service life remaining in terms of the useful life of a rubber article and where the cracking is designated as extremely severe the degradation is well beyond even this point. The results of the tests are set forth below:

Table I

| Stock | Surface Cracking After Flexing in Ozone for— | | | |
|---|---|---|---|---|
| | 8 hrs. | 32 hrs. | 56 hrs. | 80 hrs. |
| A | none | moderate | extremely severe | |
| B | do | none | very slight | slight. |

It is intended to cover all changes and modifications of the examples of the invention herein chosen for purposes of disclosure which do not constitute departures from the spirit and scope of the invention.

What is claimed is:

1. The compounds of the general formula

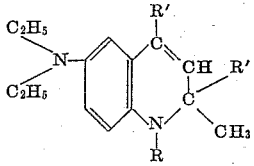

where R is selected from the group consisting of hydrogen and alkyl radicals containing one to four carbon atoms and R' represents an alkyl radical of one to four carbon atoms.

2. The compounds of the general formula

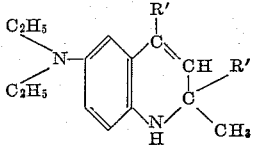

where R' represents an alkyl radical of one to four carbon atoms.

3. The compounds of the general formula

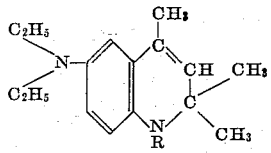

where R represents an alkyl group of less than three carbon atoms.

4. 6-diethylamino-1,2-dihydro - 2,2,4 - trimethylquinoline.
5. 6 - diethylamino - 1,2 - dihydro-1,2,2,4-tetramethylquinoline.
6. 6-diethylamino - 1,2 - dihydro-2,4-diethyl-2-methylquinoline.

References Cited in the file of this patent
UNITED STATES PATENTS

| | | |
|---|---|---|
| 1,807,355 | Ter Horst | May 26, 1931 |
| 2,381,771 | Paul | Aug. 7, 1945 |